(12) United States Patent
Lee

(10) Patent No.: US 12,090,952 B2
(45) Date of Patent: Sep. 17, 2024

(54) APPARATUS WITH COLLISION WARNING AND VEHICLE INCLUDING THE SAME

(71) Applicant: HYUNDAI MOBIS CO., LTD., Seoul (KR)

(72) Inventor: Dong Pil Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 218 days.

(21) Appl. No.: 17/845,047

(22) Filed: Jun. 21, 2022

(65) Prior Publication Data

US 2023/0001881 A1    Jan. 5, 2023

(30) Foreign Application Priority Data

Jul. 1, 2021 (KR) .................. 10-2021-0086419

(51) Int. Cl.
| | |
|---|---|
| *B60R 21/38* | (2011.01) |
| *B60W 10/18* | (2012.01) |
| *B60W 30/09* | (2012.01) |
| *B60W 30/095* | (2012.01) |
| *B60W 40/04* | (2006.01) |
| *B60W 40/12* | (2012.01) |
| *B60R 21/34* | (2011.01) |

(52) U.S. Cl.
CPC ............. *B60R 21/38* (2013.01); *B60W 10/18* (2013.01); *B60W 30/09* (2013.01); *B60W 30/0956* (2013.01); *B60W 40/04* (2013.01); *B60W 40/12* (2013.01); *B60R 2021/346* (2013.01); *B60W 2420/403* (2013.01); *B60W 2420/408* (2024.01); *B60W 2554/4029* (2020.02); *B60W 2554/4041* (2020.02); *B60W 2554/80* (2020.02)

(58) Field of Classification Search
CPC ......... B60Q 1/525; B60R 21/38; B60W 30/08
See application file for complete search history.

(56) References Cited

U.S. PATENT DOCUMENTS

| | | | |
|---|---|---|---|
| 2008/0097699 A1* | 4/2008 | Ono ................... | B62D 15/0265 |
| | | | 701/300 |
| 2015/0142287 A1 | 5/2015 | Dornieden et al. | |
| 2015/0158446 A1 | 6/2015 | Lee et al. | |
| (Continued) | | | |

FOREIGN PATENT DOCUMENTS

| | | |
|---|---|---|
| DE | 10 2012 013 689 A1 | 1/2014 |
| EP | 1 607 262 A1 | 12/2005 |
| EP | 3 138 707 A1 | 3/2017 |

OTHER PUBLICATIONS

Extended European search report issued on Nov. 3, 2022, in counterpart European Patent Application No. 22180202.8 (9 pages in English).

*Primary Examiner* — Long T Tran
(74) *Attorney, Agent, or Firm* — NSIP Law

(57) ABSTRACT

An apparatus for warning the collision of a vehicle includes an information acquirer configured to acquire information on a surrounding object and information on a vehicle, and a controller configured to generate collision predicting information for the surrounding object, based on the information on the surrounding object and the information on the vehicle, and generate control information to control braking of the vehicle and to provide, based on the collision predicting information, a buffer element to an outside of the vehicle while controlling the braking of the vehicle.

15 Claims, 9 Drawing Sheets

(56) References Cited

U.S. PATENT DOCUMENTS

| | | | |
|---|---|---|---|
| 2016/0101779 A1* | 4/2016 | Katoh | G08G 1/166 |
| | | | 340/435 |
| 2016/0272172 A1* | 9/2016 | Lee | B60T 7/22 |
| 2016/0349364 A1* | 12/2016 | Hara | G01S 13/931 |
| 2018/0178789 A1* | 6/2018 | Nishimura | B60W 30/09 |
| 2018/0293893 A1* | 10/2018 | Yang | B60W 30/18036 |
| 2019/0001973 A1* | 1/2019 | Matsunaga | B60W 30/095 |
| 2019/0135276 A1* | 5/2019 | Lee | B60W 10/20 |
| 2019/0243371 A1* | 8/2019 | Nister | G06N 3/08 |
| 2019/0329729 A1* | 10/2019 | Hilligardt | B60R 21/34 |
| 2019/0329762 A1* | 10/2019 | Kwon | B60W 30/0956 |
| 2020/0047709 A1 | 2/2020 | Gunji et al. | |
| 2020/0262384 A1 | 8/2020 | Cho | |
| 2020/0377048 A1 | 12/2020 | Umezawa et al. | |
| 2020/0391591 A1* | 12/2020 | Kim | B60W 30/09 |
| 2021/0179123 A1* | 6/2021 | Yamada | B60T 7/12 |

* cited by examiner

APPARATUS WITH COLLISION WARNING AND VEHICLE INCLUDING THE SAME

CROSS-REFERENCE TO RELATED APPLICATION

This application claims the benefit under 35 USC § 119(a) of Korean Patent Application No. 10-2021-0086419, filed in the Korean Intellectual Property Office on Jul. 1, 2021, the entire disclosure of which is incorporated herein by reference for all purposes.

BACKGROUND

1. Field

The present disclosure relates to an apparatus for collision warning and a vehicle including the same.

2. Description of Related Art

A vehicle equipped with an autonomous driving technology employs a collision avoidance system to prevent the vehicle from colliding with another object, such as a pedestrian on a road or a rider of a bicycle.

A typical collision avoidance system provides a warning sound, the vibration of a steering wheel, or a warning pop-up message to a vehicle driver or provides vehicle braking or evasive steering to prevent collision between a vehicle and a pedestrian or a user of a bicycle.

However, such a collision avoidance system may not prevent a collision accident caused by a careless pedestrian, that is, a collision accident caused by the unpredicted movement of the pedestrian, and may not provide an alert to the pedestrian to prevent the collision accident due to the avoidance of the pedestrian in advance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided an apparatus with collision warning of a vehicle, the apparatus including an information acquirer configured to acquire information on a surrounding object and information on a vehicle, and a controller configured to generate collision predicting information for the surrounding object, based on the information on the surrounding object and the information on the vehicle, and generate control information to control braking of the vehicle and to provide, based on the collision predicting information, a buffer element to an outside of the vehicle while controlling the braking of the vehicle.

The information on the surrounding vehicle may include a relative position and a relative velocity, and the information on the vehicle may include a size of the vehicle and an angular velocity of the vehicle.

The collision predicting information may include any one or any combination of a position for collision with the surrounding vehicle, a time to collision with the surrounding vehicle, and a collision risk for the surrounding vehicle.

The controller may be configured to generate the control information, in response to the position for collision being within a threshold range.

The control information may include a first control information to control the braking of the vehicle, and the controller may be configured to generate the first control information for the braking of the vehicle, in response to the collision risk being equal to or greater than a second value and being lesser than a first value, and a reciprocal number of the time to collision exceeding a first threshold time.

The controller may be configured to generate the control information, in response to the collision risk being equal to or greater than the second value and lesser than the first value, and a reciprocal number of the time to collision exceeding a second threshold time.

The controller may be configured to predict the position for collision based on the relative position and the relative velocity, predict the time to collision based on the relative position and the angle between the vehicle and the surrounding object, and predict the collision risk, based on the position for collision.

The information acquirer may be configured to detect the surrounding object in front of the vehicle using a front vehicle camera, and to detect the relative position and the relative velocity to the surrounding object using a radio detection and ranging (radar) or a light detection and ranging (Lidar).

In another general aspect, here is provided a vehicle including a collision warner configured to acquire information on a surrounding object and information on a vehicle, and to generate collision predicting information for the surrounding object, based on the information on the surrounding object and the information on the vehicle, a classifier configured to acquire classifying information for the surrounding object, and a vehicle controller configured to control braking of the vehicle, or to provide, based on the classifying information or the collision predicting information, a buffer element to an outside of the vehicle while controlling the braking of the vehicle.

The classifying information may include information to classify the surrounding object as one of a child or an adult.

The classifier may be configured to acquire the classifying information, based on a height of the surrounding object or a body type of the surrounding object.

The information on the surrounding object may include a relative position to the surrounding object and a relative velocity to the surrounding object, and wherein the vehicle information may include a size of the vehicle and an angular velocity of the vehicle.

The collision predicting information may include a position for collision with the surrounding vehicle, a time to collision with the surrounding vehicle, and a collision risk for the surrounding vehicle.

The vehicle controller may be configured to control the braking of the vehicle, or to provide the buffer element to the outside of the vehicle, in response to a position for collision being within a threshold range.

The vehicle controller may be configured to brake the vehicle, in response to a collision risk being equal to or greater than a second value and being lesser than a first value, and a reciprocal number of the time to collision exceeding a first threshold time.

The vehicle controller may be configured to provide the buffer element to the outside of the vehicle while controlling the braking of the vehicle, in response to the collision risk being equal to or greater than the second value and being lesser than the first value, and the reciprocal number of the time to collision exceeding a second threshold time.

The vehicle controller may be configured to provide the buffer element to a lower portion of the vehicle, in response to the classifying information corresponding to a child.

The vehicle controller may be configured to provide the buffer element to a bonnet of the vehicle and a windshield of the vehicle, in response to the classifying information corresponding to an adult.

The collision warner may be configured to predict the position for the collision based on the relative position and the relative velocity, to predict the time to collision based on the relative position and an angle between the vehicle and the surrounding object, and to predict the collision risk based on the position for collision.

Other features and aspects will be apparent from the following detailed description, the drawings, and the claims.

Figure 1:
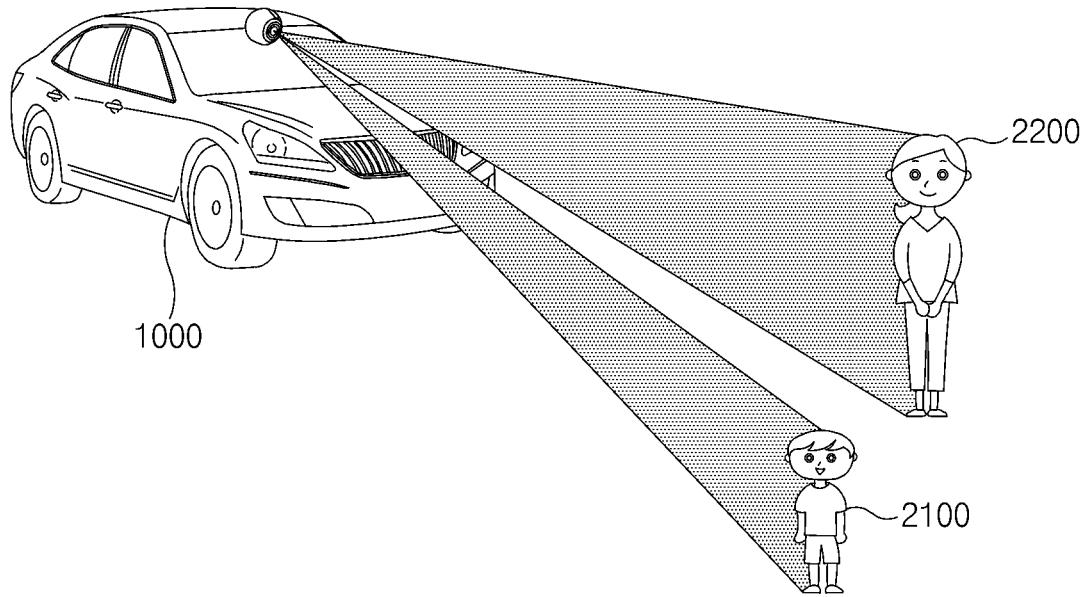
FIG. 1 is a view schematically a vehicle, according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third", A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms used herein including technical or scientific terms have the same meaning as commonly understood by one of ordinary skill in the art to which examples belong. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 2:
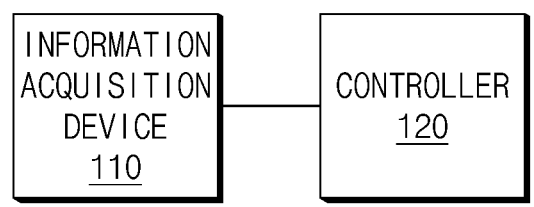
FIG. 2 is a block diagram illustrating components of the vehicle, according to an embodiment of the present disclosure.

FIG. 1 is a view schematically a vehicle, according to an embodiment of the present disclosure. FIG. 2 is a block diagram illustrating components of the vehicle, according to an embodiment of the present disclosure.

Hereinafter, the configuration and the operation of a vehicle 1000 will be described with reference to FIGS. 1 and 2.

Referring to FIG. 1, the vehicle 1000 may analyze a collision risk between the surrounding object 2000, which is positioned in front of the vehicle 1000, may control braking based on the result of the analyst, and may provide a buffer element to the outside of the vehicle 1000 while controlling the braking of the vehicle.

In this case, the buffer element of the vehicle 1000 may be defined as a shock absorber to absorb an impact such that an injury rate is reduced, when an accident occurs. For example, the buffer element may include an airbag which is an air bag to absorb an impact of the vehicle 1000.

For example, the buffer element of the vehicle 1000 may be disposed at a lower portion of the vehicle 1000, a bonnet of the vehicle 1000, and a windshield of the vehicle 1000 to absorb the impact, when the vehicle collides with the surrounding object 2000.

The surrounding object 2000 may include, for example, a vulnerable road user (VRU) positioned in front of the vehicle 1000. The VRU may include a pedestrian or a bicycle user positioned on the road. The surrounding object 2000 may include an object, which changes a moving direction or a moving velocity, as the surrounding object 2000 receives the influence of the vehicle 1000 or the influence of a vehicle surrounding object. The surrounding object may be classified as one of, for example, a child 2100 or an adult 2200.

Referring to FIG. 2, the vehicle 1000 may include an apparatus (a collision warning device 100, which may also be referred to as collision warner 100) for warning collision, a classifying device 200, which may also be referred to as classifier 200, and a control device 300, which may also be referred to as controller 300.

The collision warning device 100 may recognize the surrounding object 2000 in front of the vehicle and may analyze the collision risk between the vehicle 1000 and the surrounding object 2000. For example, the collision warning device 100 may generate collision predicting information for the surrounding object 2000, and may generate control information for controlling the braking of the vehicle, and for providing the buffer element to the outside of the vehicle while controlling the braking of the vehicle, based on the collision predicting information.

The collision warning device 100 may acquire object information of the surrounding object 2000 and vehicle information. In this case, the object information may include a relative position and a relative velocity to the surrounding object 2000, and the vehicle information may include the size and the angular velocity of the vehicle 1000.

The collision warning device 100 may generate the collision predicting information for the surrounding object 2000, based on the acquired information on the surrounding object 2000 and the vehicle information.

In detail, the collision warning device 100 may generate a position $y_{pred}$ for collision, a time $TTC_{Radial}$ to collision, and a collision risk $r_{index}$ with respect to the surrounding object 2000, based on the relative position and the relative velocity to the surrounding object 2000 and the size and the angular velocity of the vehicle 1000.

The collision warning device 100 may predict the position $y_{pred}$ for collision of the surrounding object 2000, based on the relative position and the relative velocity to the surrounding object 2000.

In addition, the collision warning device 100 may predict the time $TTC_{Radial}$ to collision, based on the relative position to the surrounding object 2000, and the angle between the vehicle 1000 and the surrounding object 2000, and may calculate a reciprocal number $TTC_{Radial}^{-1}$ of the time to collision based on the time to collision.

In addition, the collision warning device 100 may predict the collision risk $r_{index}$, based on the position $y_{pred}$ for collision with the surrounding object 2000.

The collision warning device 100 may generate the control information for controlling the braking of the vehicle 1000, and for providing the buffer element to the outside of the vehicle 1000 while controlling the braking of the vehicle 1000, based on the position $y_{pred}$ for collision, the reciprocal number $TTC_{Radial}^{-1}$ of the time to collision, and the collision risk $r_{index}$.

The classifying device 200 may acquire classifying information of the surrounding object 2000. In this case, the classifying information may be defined as information obtained, as the surrounding object 2000 is classified as any one of a child 2100 or an adult 2200.

The classifying device 200 may measure the height and the length of the surrounding object 2000 through a radar or a Light Detection and Ranging (Lidar). The classifying device 200 may represent an outer appearance of the surrounding object 2000 in the form of the set of three-dimensional coordinates, by projecting a laser beam to the surrounding object 2000 at specific time intervals through the Lidar, and measuring the direction of a laser beam reflected from the surrounding object 2000 and the distance to the surrounding object 2000. The classifying device 200 may acquire the classifying information, based on the outer appearance of the surrounding object 2000.

The control device 300 may include an electronic control unit (ECU) of the vehicle, which sets a warning state or a braking state of the vehicle 1000, by making vehicle communication with the collision warning device 100 and the classifying device 200.

The control device 300 may control the braking of the vehicle 1000 or may provide the buffer element to the outside of the vehicle while controlling the braking of the vehicle, based on the control information acquired from the collision warning device 100 and the classifying information acquired through the classifying device 200.

For example, the control information acquired from the collision warning device 100 may be information generated based on the collision predicting information.

In detail, the control device 300 may control the braking of the vehicle 1000 or provide the buffer element to the outside of the vehicle while controlling the braking of the vehicle 1000, based on the position $y_{pred}$ for collision, the reciprocal number $TTC_{Radial}^{-1}$ of the time to collision, and the collision risk $r_{index}$.

The control device 300 may control the braking of the vehicle, when the collision risk $r_{index}$ is less than the second value, and when the reciprocal number $TTC_{Radial}^{-1}$ of the time to collision exceeds a first threshold time. In this case, the second value may include a value $r_1$, and the first threshold time may serve as a reference for determining whether the braking of the vehicle 1000 is provided.

The control device 300 may provide the buffer element to an outside of the vehicle while controlling the braking of the vehicle 1000, when the collision risk $r_{index}$ is less than a second value, and when the reciprocal number $TTC_{Radial}^{-1}$ of the time to collision exceeds a second threshold time. In this case, the second value may include a value $r_1$, and the second threshold time may serve as a reference for determining whether the buffer element is provided to the outside of the vehicle 1000.

Figure 3:
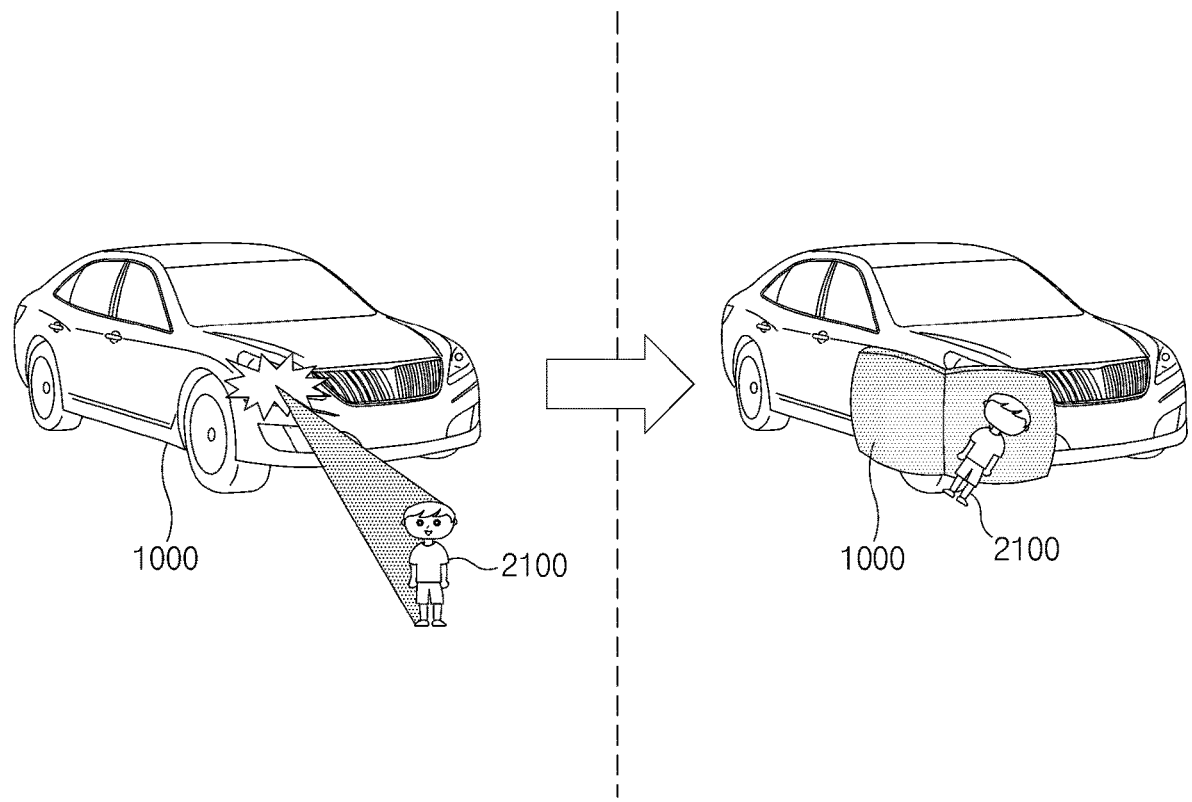
FIG. 3 is a view illustrating the operation of a vehicle for a surrounding object depending on a collision warning of a vehicle, according to an embodiment of the present disclosure.

FIG. 3 is a view illustrating an operation of a vehicle for a surrounding object depending on a collision warning of a vehicle, according to an embodiment of the present disclosure.

Referring to FIG. 3, the control device 300 of the vehicle 1000 may provide the buffer element to a lower portion of the vehicle while controlling the braking of the vehicle 1000, when the classifying information of the surrounding object 2000 acquired through the classifying device 200 corresponds to a child 2100, when the collision risk $r_{index}$ of the surrounding object 2000 is less than the second value, and when the reciprocal number $TTC_{Radial}^{-1}$ of the time to collision exceeds the second threshold time.

In other words, in FIG. 3, the control device 300 may provide the buffer element to the lower portion of the vehicle 1000 to prevent the child 2100 from being carried by the vehicle 1000, when the classifying information of the surrounding object 2000 is the child 2100. In addition, the second value may include the value $r_1$, and the second threshold time may serve as a reference for determining whether the buffer element is provided to the vehicle 1000.

Figure 4:
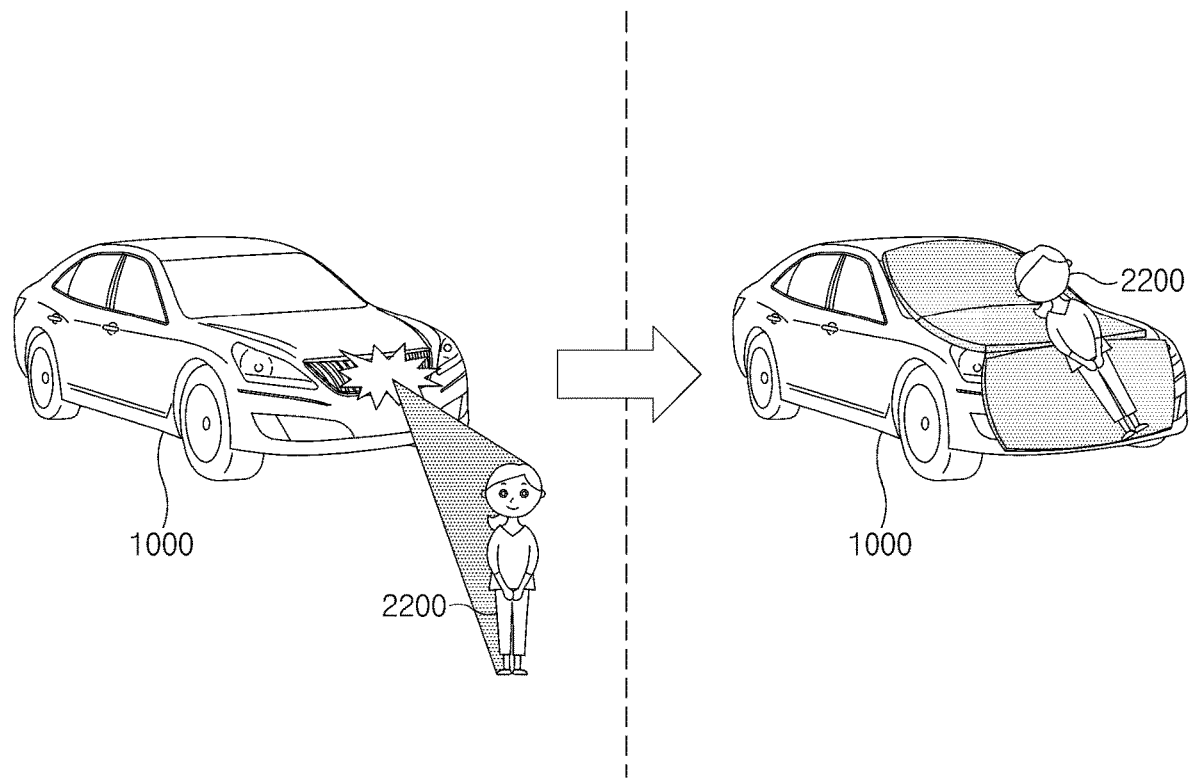
FIG. 4 is a view illustrating the operation of a vehicle for a surrounding object depending on a collision warning of a vehicle, according to another embodiment of the present disclosure.

FIG. 4 is a view illustrating the operation of a vehicle for a surrounding object depending on a collision warning of a vehicle, according to another embodiment of the present disclosure.

Referring to FIG. 4, the control device 300 of the vehicle 1000 may provide the buffer element to a bonnet and a windshield of the vehicle 1000 while controlling the braking of the vehicle 1000, when the classifying information of the surrounding object 2000 acquired through the classifying device 200 corresponds to the adult 2200, when the collision risk $r_{index}$ of the surrounding object 2000 is less than the second value, and when the reciprocal number $TTC_{Radial}^{-1}$ of the time to collision exceeds the second threshold time.

In other words, in FIG. 4, the control device 300 may provide the buffer element to the bonnet and the windshield of the vehicle 1000 by considering that a collision region is increased due to a body type of the adult 2200 larger than that of the child 2100, when the classifying information of the surrounding object 2000 is the adult 2200. In addition, the second value may include the value $r_1$, and the second threshold time may be a reference time serving as a reference for determining whether the buffer element is provided to the vehicle 1000.

Hereinafter, the configuration and the operation of the collision warning device 100 to generate a position for collision with the surrounding object 2000, a time to collision with the surrounding object 2000, and a collision risk for the surrounding object 2000 will be described in detail with reference to FIG. 5.

Figure 5:
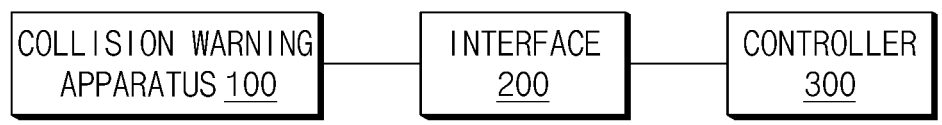
FIG. 5 is a block diagram illustrating components of an apparatus for warning collision, according to an embodiment of the present disclosure.

FIG. 5 is a block diagram illustrating components of a collision warning device, according to an embodiment of the present disclosure.

Referring to FIG. 5, the collision warning device 100 may include an information acquiring section 110, which may also be referred to as information acquirer 110, and a controller 120.

The information acquiring section 110 may acquire information on the surrounding object 2000 and information on the vehicle.

The information acquiring section 110 may detect the surrounding object 2000 in front of the vehicle 1000 through a front camera of the vehicle 1000.

In addition, the information acquiring section 110 may detect the relative position and the relative velocity to the surrounding object 2000 through a radar or a Lidar. For example, the radar may acquire the distance to the surrounding object 2000. The radar may transmit a transmit electromagnetic wave to the surrounding object 2000, which is detected through the front camera, and may receive a receive electromagnetic wave reflected from the surrounding object 2000. The radar may acquire the distance to the surrounding object 2000, the relative position to the surrounding object 2000, and the relative velocity of the surrounding object 2000 by using the time difference between the transmit electromagnetic wave and the receive electromagnetic wave and the variation in the Doppler frequency.

The controller 120 may generate the collision predicting information of the surrounding object 2000, based on the information on the surrounding object 2000 acquired by the information acquiring section 110 and the vehicle information. In detail, the controller 120 may generate the position $y_{pred}$ for collision with the surrounding object 2000, the time $TTC_{Radial}$ to collision with the surrounding object 2000, and the collision risk $r_{index}$, based on the relative position to the surrounding object 2000, the relative velocity to the surrounding object 2000, the size of the vehicle 1000, and the angular velocity of the vehicle 1000.

The controller 120 may generate the control information for controlling the braking of the vehicle 1000 or for providing the buffer element to the outside of the vehicle while controlling the braking of the vehicle. The controller 120 may transmit the control information to the control device 300.

The following description will be made with reference to an operation in which the controller 120 predicts the position for collision with the surrounding object 2000, based on the relative position to the surrounding object 2000, and the relative velocity to the surrounding object 2000.

Figure 6:
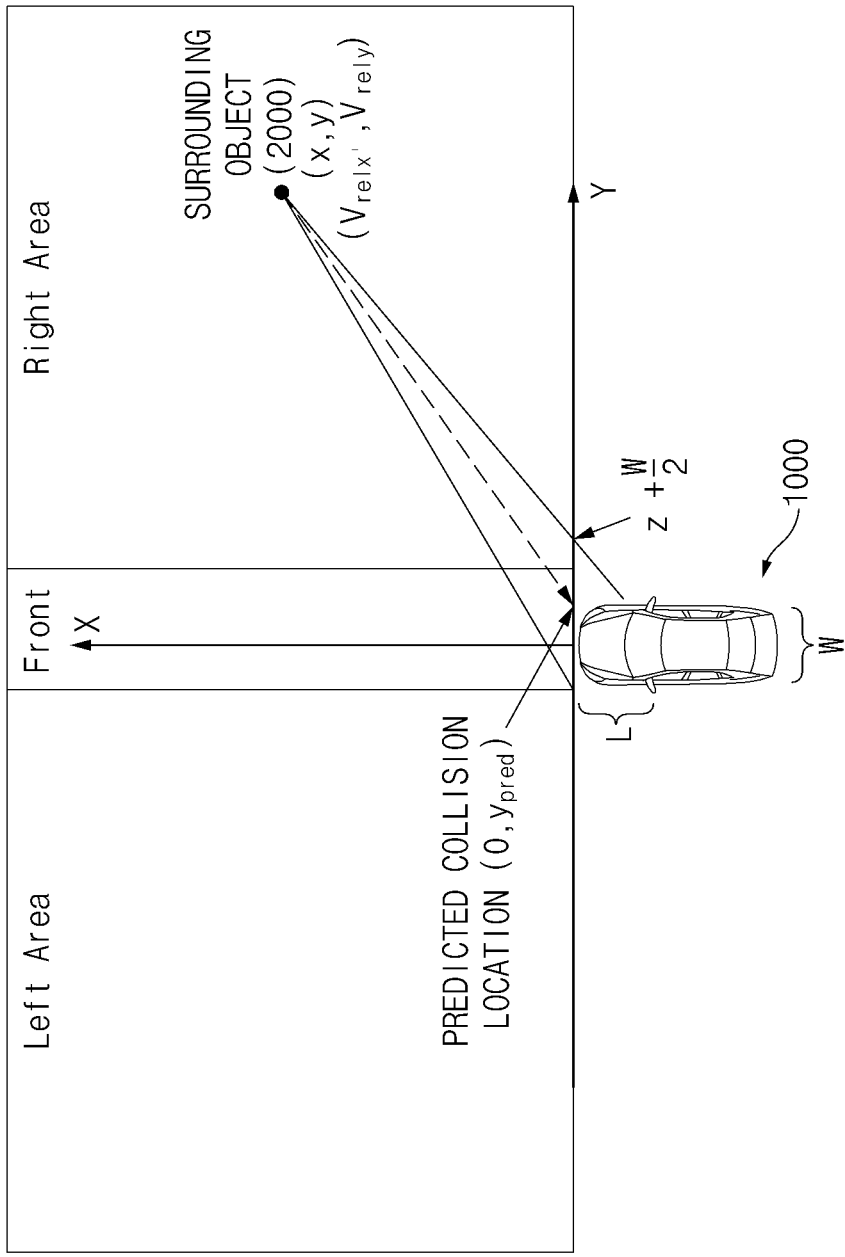
FIG. 6 is a view illustrating an operation for predicting a position for collision by an apparatus for warning collision, according to an embodiment of the present disclosure.

FIG. 6 is a view illustrating an operation for predicting a position for collision by a collision warning device, according to an embodiment of the present disclosure.

Referring to FIG. 6, the controller 120 may calculate the position $y_{pred}$ for collision with the surrounding object 2000, based on following Equation 1.

$$y_{pred} = y - \frac{V_{rely}}{V_{relx}} \cdot x \qquad \text{Equation 1}$$

In Equation 1, denotes the relative position to the surrounding object 2000, ($V_{relx}$, $V_{rely}$) denotes the relative velocity of the surrounding object 2000, and $y_{pred}$ denotes the position for collision.

The controller 120 may determine that the collision risk between the surrounding object 2000 and the vehicle 1000 is present, when the position for collision with the surrounding object 2000 is included in a threshold range.

In this case, the controller 120 may variously specify the threshold range, depending on whether the surrounding object 2000 is positioned in at least one of a front surface, a left surface, or a right surface. The threshold range may be classified into a left threshold range of the vehicle 1000 and a right threshold range of the vehicle 1000. In other words, the controller 120 may determine that the collision risk between the surrounding object 2000 and the vehicle 1000 is present, when the surrounding object 2000 is disposed in the left threshold range or the right threshold range of the vehicle 1000.

The controller 120 may calculate the threshold range, based on following Equation 2.

$$z = \frac{L\left(|y| - \frac{w}{2}\right)}{w(x + L)} \qquad \text{Equation 2}$$

$$z(x, y) = \begin{cases} -z, & y < 0 \\ z, & y \geq 0 \end{cases}$$

When, the surrounding object 2000 is at the left of the vehicle 1000, the left threshold range=−w/2, and the right threshold range=z (x, y)+w/2

When, the surrounding object 2000 is at the right of the vehicle 1000, the left threshold range=z (x,y)−w/2, and the right threshold range=w/2.

When, the surrounding object 2000 is at the front of the vehicle 1000, the left threshold range=−w/2, and the right threshold range=w/2.

In Equation 2, (x, y) denotes the relative position to the surrounding object 2000, ($V_{relx}$, $V_{rely}$) denotes the relative velocity to the surrounding object 2000, 'w' denotes the width of the vehicle 1000, and 'L' denotes the distance from a front end of the vehicle 1000 to A piallar of the vehicle 1000.

In this case, z(x, y) may be defined as a variable used to determine whether the position $y_{pred}$ for collision with the surrounding object 2000 belongs to the threshold range of the surrounding object 2000. The controller 120 may determine, based on z(x, y), whether the position $y_{pred}$ for collision of the surrounding object 2000 belongs to the threshold range of the surrounding object 2000.

The following description will be made regarding the operation for predicting the time $TTC_{Radial}$ to collision, based on the relative position to the surrounding object 2000, and the angle between the vehicle 1000 and the surrounding object 2000.

Figure 7:
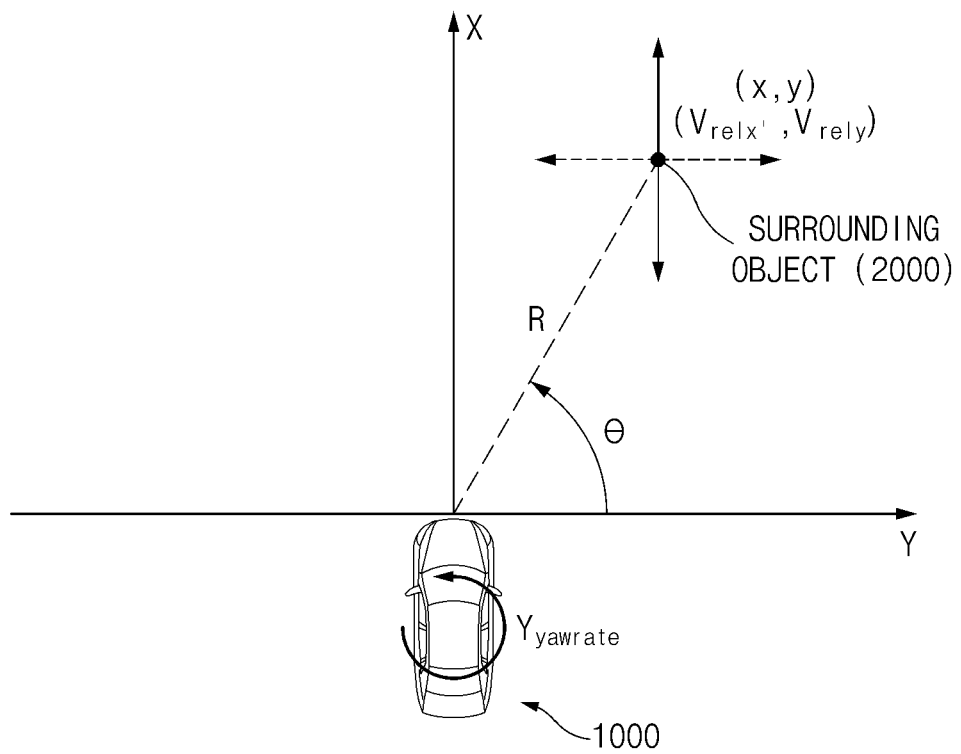
FIG. 7 is a view illustrating an operation for predicting a time to collision by an apparatus for warning collision, according to an embodiment of the present disclosure.
Figure 8:
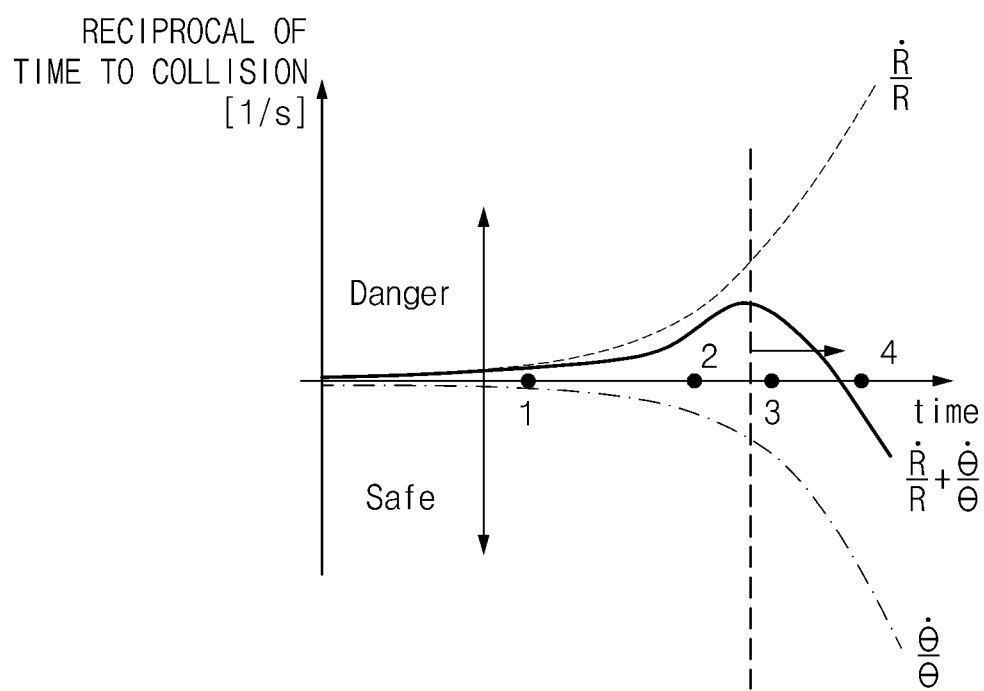
FIG. 8 is a view illustrating a reciprocal number of a time to collision, according to an embodiment of the present disclosure.

FIG. 7 is a view illustrating an operation for predicting a time to collision by the collision device, according to an embodiment of the present disclosure. FIG. 8 is a view illustrating a reciprocal number of a time to collision, according to an embodiment of the present disclosure.

First, referring to FIG. 7, the controller 120 may calculate the reciprocal number $TTC_{Radial}^{-1}$ of the time to collision, based on the relative position to the surrounding object 2000, the relative velocity ($V_{relx}$, $V_{rely}$) to the surrounding object 2000, the angular velocity $\gamma_{yawrate}$ of the vehicle 1000, and the angle θ between the surrounding object 2000 and the vehicle 1000. In other words, the controller 120 may calculate the reciprocal number $TTC_{Radial}^{-1}$ of the time to collision, in which the angular velocity $\gamma_{yawrate}$, which is radial information, of the vehicle 1000, and the lateral movement of the surrounding object 2000 are reflected, based on the angular velocity $\gamma_{yawrate}$ a of the vehicle 1000, and the angle θ between the surrounding object 2000 and the vehicle 1000.

The controller 120 may calculate the reciprocal number $TTC_{Radial}^{-1}$ of the time to collision, based on following Equation 3.

$$\dot{R} = \frac{x\dot{x} + y\dot{y}}{\sqrt{x^2 + y^2}}$$

$$\dot{\theta} = \frac{x\dot{y} - \dot{x}y}{x^2 + y^2}$$

$$\dot{x} = v_{relx} - \gamma_{yawrate} * y$$

$$\dot{y} = v_{rely} + \gamma_{yawrate} * x$$

$$TTC_{Radial}^{-1} = \frac{\dot{R}}{R} + \frac{\dot{\theta}}{\theta}$$

Equation 3

In Equation 3, $\dot{R}$ denotes a value obtained by differentiating the distance 'R' between the vehicle 1000 and the surrounding object 2000, (x,y) denotes the relative position to the surrounding object 2000, ($V_{relx}$, $V_{rely}$) denotes the relative velocity to the surrounding object 2000, $\gamma_{yawrate}$ denotes the angular velocity of the vehicle 1000, and θ denotes an angle between the surrounding object 2000 and the vehicle 1000.

FIG. 8 is a graph illustrating the relationship between the reciprocal number $TTC_{Radial}^{-1}$ of the time to collision and a time. In FIG. 6, point '1', '2', or '3' on a time axis are points at which the reciprocal number $TTC_{Radial}^{-1}$ of the time to collision belongs to a dangerous region, and point '4' is a point at which the reciprocal number $TTC_{Radial}^{-1}$ of the time to collision belongs to a safe region.

In other words, point '1', '2', or '3' represents the case that the reciprocal number $TTC_{Radial}^{-1}$ of the time to collision exceeds a reference value. As the time to collision becomes shorter than the reference time, the collision risk between the collision 1000 and the surrounding object 2000 may be increased.

In addition, the point '4' on the time axis denotes the case that the reciprocal number, $TTC_{Radial}^{-1}$ of the time to collision is less than a reference value based on a specific reference value. Accordingly, the time to collision becomes longer than the reference time, the collision risk between the collision 1000 and the surrounding object 2000 may be decreased.

Further, the controller 120 may predict the collision risk $r_{index}$, based on the position for collision with the surrounding object 2000.

The controller 120 may calculate the collision risk $r_{index}$ of the surrounding object 2000, based on Equation 4.

$$r_{index} = \frac{1}{a} y_{pred}^2 + \frac{1}{b} \dot{y}_{pred} * y_{pred}$$

Equation 4

In Equation 4, $y_{pred}$ denotes the position for collision with the surrounding object 2000, $\dot{y}_{pred}$ refers to a value obtained by differentiating $y_{pred}$ with respect to time, and 'a' and 'b' denote tuning variables. The controller 120 may calculate the collision risk $r_{index}$ as a secondary function of the position $y_{pred}$ for collision with the surrounding object 2000.

Figure 9:
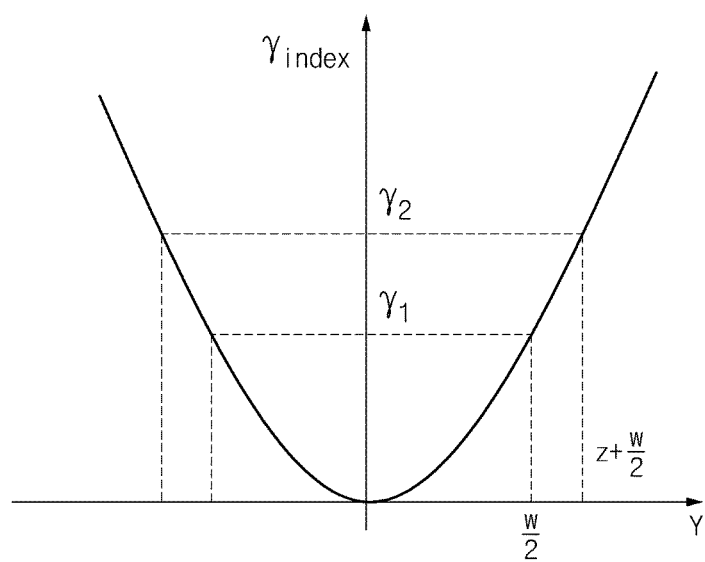
FIG. 9 is a view illustrating a collision risk depending on a position for collision, according to an embodiment of the present disclosure.

FIG. 9 is a view illustrating a collision risk depending on a position for collision, according to an embodiment of the present disclosure. In detail, FIG. 7 is a graph representing the collision risk when the value of $\dot{y}_{pred}$ is '0' in Equation 4.

In FIG. 9, when a y-coordinate value of the relative position to the surrounding object 2000 is $$\frac{w}{2},$$

the collision risk $r_{index}$ is $r_1$. When the y-coordinate value of the relative position to the surrounding object 2000 is $$z + \frac{w}{2},$$

the collision risk $r_{index}$ is $r_2$. In this case, when the collision risk is $r_{index}$ is $r_1$, the collision between the vehicle 1000 and the surrounding object 2000 is predicted within the width 'L' of a front surface of the vehicle 1000. When the collision risk $r_{index}$ is $r_1$~$r_2$, the collision between the vehicle 1000 and the surrounding object 2000 is predicted in the width of A-Pillar on the lateral surface of the vehicle 1000.

The controller 120 may generate control information for controlling the braking of the vehicle 1000 or for providing a buffer element to an outside of the vehicle while controlling the braking of the vehicle, based on the collision predicting information.

In other words, the controller 120 may generate control information for controlling the braking of the vehicle 1000 or for providing a buffer element to an outside of the vehicle while controlling the braking of the vehicle, based on the position $y_{pred}$ collision, the reciprocal number $TTC_{Radial}^{-1}$ a of the time to collision, and the collision risk $r_{index}$ As described above, according to an embodiment of the present disclosure, the vehicle 1000 may warn the pedestrian to provide a chance to avoid the collision, and may provide the buffer element to the outside of the vehicle 1000, thereby preventing the collision accident in advance.

In addition, the vehicle 1000 may calculate the collision risk to the surrounding object 2000, and may provide a warning classified depending on the collision risk, thereby forming a collision avoidance system optimized for the driving situation of the vehicle.

In addition, the vehicle 1000 may analyze the collision risk to reduce the unnecessary braking and the developing operation of the buffer element. Accordingly, the fuel efficiency of the vehicle 1000 may be improved. In addition, the vehicle 1000 may prevent the sudden stop, such that the safety of the driver and the occupant of the vehicle 1000 may be improved.

An aspect of the present disclosure provides an apparatus for warning collision, capable of warning a pedestrian to prevent the collision accident in advance, and of providing warnings classified depending on collision risks, and a vehicle including the same.

According to an embodiment of the present disclosure, in the apparatus for warning the collision and a vehicle including the same, the warning is provided to the pedestrian such that the collision accident is prevented in advance, and the warning classified depending on the collision risks may be provided.

The above description is merely an example of the technical idea of the present disclosure, and various modifications and modifications may be made by one skilled in the art without departing from the essential characteristic of the present disclosure.

The collision warning device 100 or the collision warner 100, the classifying device 200 or the classifier 200, the control device 300 or the controller 300, the information acquiring section 110 or the information acquirer 110, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of collision warning of a vehicle. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus with collision warning of a vehicle, the apparatus comprising:
   an information acquirer configured to acquire information on a surrounding object and information on the vehicle; and
   a controller configured to:
   generate collision predicting information for the surrounding object, based on the information on the surrounding object and the information on the vehicle, the collision predicting information including a time to collision between the vehicle and the surrounding object, and
   generate control information to control braking of the vehicle and to provide, based on the collision predicting information, a buffer element to an outside of the vehicle while controlling the braking of the vehicle, such that the controller provides braking of the vehicle in a case in which a reciprocal number of the time to collision exceeds a first threshold time and the controller additionally provides the buffer element in a case in which the reciprocal number of the time to collision exceeds a second threshold time that is greater than the first threshold time.

2. The apparatus of claim 1, wherein the information on the surrounding vehicle comprises:
   a relative position and a relative velocity, and
   wherein the information on the vehicle comprises a size of the vehicle and an angular velocity of the vehicle.

3. The apparatus of claim 2, wherein the collision predicting information comprises any one or any combination of a position for collision with the surrounding vehicle and a collision risk for the surrounding vehicle.

4. The apparatus of claim 3, wherein the controller is further configured to:
   generate the control information based on the position for collision.

5. The apparatus of claim 3, wherein the controller is further configured to:
   predict the position for collision based on the relative position and the relative velocity,
   predict the time to collision based on the relative position and the angle between the vehicle and the surrounding object, and
   predict the collision risk, based on the position for collision.

6. The apparatus of claim 2, wherein the information acquirer is further configured to detect the surrounding object in front of the vehicle using a front vehicle camera, and to detect the relative position and the relative velocity to the surrounding object using a radio detection and ranging (radar) or a light detection and ranging (Lidar).

7. A vehicle comprising:
   a collision warner configured to acquire information on a surrounding object and information on the vehicle, and to generate collision predicting information for the surrounding object, based on the information on the surrounding object and the information on the vehicle, the collision predicting information including a time to collision between the vehicle and the surrounding object;
   a classifier configured to acquire classifying information for the surrounding object; and a vehicle controller configured to control braking of the vehicle, and to provide, based on the classifying information or the collision predicting information, a buffer element to an outside of the vehicle while controlling the braking of the vehicle, such that the vehicle controller provides braking of the vehicle in a case in which a reciprocal number of the time to collision exceeds a first threshold time and the controller additionally provides the buffer element in a case in which the reciprocal number of the time to collision exceeds a second threshold time that is greater than the first threshold time.

8. The vehicle of claim 7, wherein the classifying information comprises information to classify the surrounding object as one of a child or an adult.

9. The vehicle of claim 7, wherein the classifier is further configured to acquire the classifying information, based on a height of the surrounding object or a body type of the surrounding object.

10. The vehicle of claim 7, wherein the information on the surrounding object comprises:
  a relative position to the surrounding object and a relative velocity to the surrounding object, and
  wherein the vehicle information comprises a size of the vehicle and an angular velocity of the vehicle.

11. The vehicle of claim 10, wherein the collision predicting information comprises:
  a position for collision with the surrounding vehicle and a collision risk for the surrounding vehicle.

12. The vehicle of claim 11, wherein the vehicle controller is further configured to:
  control the braking of the vehicle, or to provide the buffer element to the outside of the vehicle, based on the position for collision.

13. The apparatus of claim 11, wherein the collision warner is further configured to predict the position for the collision based on the relative position and the relative velocity, to predict the time to collision based on the relative position and an angle between the vehicle and the surrounding object, and to predict the collision risk based on the position for collision.

14. The vehicle of claim 7, wherein the vehicle controller is further configured to:
  provide the buffer element to a lower portion of the vehicle, in response to the classifying information corresponding to a child.

15. The vehicle of claim 7, wherein the vehicle controller is further configured to:
  provide the buffer element to a bonnet of the vehicle and a windshield of the vehicle, in response to the classifying information corresponding to an adult.

* * * * *